(12) United States Patent
Kondou et al.

(10) Patent No.: US 7,444,039 B2
(45) Date of Patent: Oct. 28, 2008

(54) OPTICAL MODULATOR

(75) Inventors: Katsutoshi Kondou, Tokyo (JP);
Masayuki Ichioka, Tokyo (JP); Takashi Shinriki, Tokyo (JP); Tohru Sugamata, Tokyo (JP); Junichiro Ichikawa, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 111 days.

(21) Appl. No.: 11/389,380

(22) Filed: Mar. 24, 2006

(65) Prior Publication Data

US 2008/0002926 A1    Jan. 3, 2008

(30) Foreign Application Priority Data

Mar. 25, 2005    (JP) .............................. 2005-087758

(51) Int. Cl.
*G02F 1/035*    (2006.01)
(52) U.S. Cl. ......................................................... 385/2
(58) Field of Classification Search ...................... 385/2
See application file for complete search history.

(56) References Cited

U.S. PATENT DOCUMENTS

2002/0048076 A1*    4/2002    Kondo et al. ................ 359/322

2006/0110089 A1*    5/2006    Ichikawa et al. ............... 385/3

FOREIGN PATENT DOCUMENTS

| JP | 64-018121 | 1/1989 |
| JP | 08-194195 | 7/1996 |
| JP | 2001-281507 | 10/2001 |
| JP | 2003-215519 | 7/2003 |

\* cited by examiner

*Primary Examiner*—Quyen P Leung
(74) *Attorney, Agent, or Firm*—Chapman and Cutler LLP

(57) ABSTRACT

An optical modulator capable of efficiently separating radiation light and propagation light from each other or removing the radiation light in the optical modulator to suppress loss of the optical modulator and deterioration of an extinction ratio, including a thin plate of a material having an electrooptic effect and a thickness of 20 μm or less; an optical waveguide formed in a top surface or a bottom surface of the thin plate; and a modulation electrode formed in the top surface of the thin plate to modulate light which propagates in the optical waveguide, the optical waveguide has an optical junction portion in which a plurality of optical waveguide portions are joined together and, for shielding a portion of radiation light radiated from the optical junction portion, a concave portion or through-hole in the thin plate.

15 Claims, 5 Drawing Sheets

(a)

(a)

(b)

(a)

(b)

(a)

(b)

OPTICAL MODULATOR

BACKGROUND OF THE INVENTION

1. Field of the Invention

The present invention relates to an optical modulator, and more particularly, to an optical modulator including a thin plate made of a material having an electrooptic effect and having a thickness of 20 μm or less.

2. Related Art Statement

Conventionally, in an optical communication field or an optical measurement field, a waveguide type optical modulator in which an optical waveguide or a modulation electrode is formed on a substrate having an electrooptic effect is much used.

Particularly, as multimedia has been developed, the amount of communication tends to increase and thus wider bandwidth of an optical modulation frequency needs to be realized. As a realizing means thereof, an external modulation method using a LN modulator or the like has been diversified. However, in order to realize the wider bandwidth of the LN modulator, velocity matching between a light wave and a microwave which is a modulation signal and reduction of a driving voltage need to be realized.

As a means for solving the above-described problems, a technique for reducing the thickness of a substrate such that the velocity matching condition between the microwave and the light wave is satisfied and the driving voltage is reduced is conventionally known.

In Patent Document 1 or 2, an optical waveguide and a modulation electrode are mounted on a thin substrate (hereinafter, referred to as "first substrate") having a thickness of 30 μm or less and another substrate (hereinafter, referred to as "second substrate") having dielectric constant lower than that of the first substrate is bonded to the first substrate, such that an effective refractive index of the microwave is lowered, the velocity matching between the microwave and the light wave is realized and mechanical strength of the substrate is maintained.

[Patent Document 1] Japanese Unexamined Patent Application Publication No. S64-18121

[Patent Document 2] Japanese Unexamined Patent Application Publication No. 2003-215519

Meanwhile, in the waveguide type optical modulator, an optical waveguide having an optical junction portion in which a plurality of optical waveguide portions are joined together is formed, similar to a Mach-Zehnder type optical waveguide. Radiation light is radiated from the optical junction portion to the outside of the optical waveguide according to the condition of the joined light wave. As disclosed in Patent Document 3, the operation state of the optical modulator is monitored using the radiation light.

[Patent Document 3] Japanese Unexamined Patent Application Publication No. 2001-281507

In a case of a thick plate structure (100 μm or more), the radiation light is radiated from the surface of the substrate to the inside of the substrate, as shown in FIG. 1. Thus, characteristic deterioration of the modulator due to the radiation light may be commercially ignored. In Patent Document 4, an output waveguide is bent to adjust the positions of the propagation light and the radiation light of the waveguide, thereby separating the light. Since Patent Document 4 is premised on lens coupling, there is a problem that the propagation light and the radiation light are mixed. However, in a "pigtail type optical modulator" in which an optical fiber is directly connected to the optical modulator, since the propagation light 7 and the radiation light 8 are separated from each other by 100 μm or more as shown in FIG. 1, the radiation light is not inputted into the fiber.

[Patent Document 4] Japanese Unexamined Patent Application Publication No. H8-194195

However, in the above-described thin plate, the thin plate functions as a slab waveguide. Thus, as shown in FIG. 3, the radiation light forms a radiation light spot 8 which is spread in a lateral direction (direction parallel to the surface of the substrate) in the end portion of the thin plate. Thus, a light spot (propagation spot) 7 of the propagation light which propagates in the optical waveguide and a portion of the radiation light spot 8 are close or overlapped to each other, and thus a portion of the radiation light is inputted into an optical fiber when the propagation light is introduced into the optical fiber. As a result, an extinction ratio of the optical modulator deteriorates or misalignment at the time of connecting the fiber is apt to be caused due to overlapping between the radiation light spot and the propagation light spot.

FIG. 2A is a view showing an optical modulator when viewed from the top, and, for simplification of description, an electrode and a buffer layer are omitted. Reference numeral 1 denotes a thin plate, 4 denotes a Mach-Zehnder type optical waveguide, 5 denotes an output optical waveguide portion of the waveguide, 6 denotes input light, and 8 denotes radiation light radiated from an optical junction portion of the optical waveguide. FIG. 2B shows the end portion of the output side of the optical modulator. Reference numeral 7 denotes a propagation light spot of propagation light which propagates in the output optical waveguide portion 5, 8 denotes a radiation light spot, 2 denotes an adhesive layer, and 3 denotes a reinforcement plate for reinforcing the thin plate 1. FIG. 3 shows an intensity distribution of the light 7 from the output optical waveguide and the radiation light 8 when the thickness of the thin plate is 10 μm.

SUMMARY OF THE INVENTION

The present invention is to solve the above-described problems, and an object of the present invention is to provide an optical modulator which efficiently separates radiation light and propagation light from each other or removes the radiation light in the optical modulator to suppress loss of the optical modulator and deterioration of an extinction ratio.

In order to solve the above-described problems, according to a first aspect of the present invention, there is provided an optical modulator including: a thin plate made of a material having an electrooptic effect and having a thickness of 20 μm or less; an optical waveguide formed in a top surface or a bottom surface of the thin plate; and a modulation electrode which is formed in the top surface of the thin plate to modulate light which propagates in the optical waveguide, wherein the optical waveguide has an optical junction portion in which a plurality of optical waveguide portions are joined together and a shielding means for shielding a portion of radiation light radiated from the optical junction portion.

According to a second aspect of the present invention, in the optical modulator according to the first aspect, the shielding means is a concave portion or a thorough-hole formed in the thin plate, a shortest distance from the waveguide to the shielding means is 5 to 10 μm, and the length of the shielding means in a direction perpendicular to the waveguide is at least 0.5 times the diameter of a fiber.

According to a third aspect of the present invention, in the optical modulator according to the second aspect, the concave portion or the through-hole formed in the thin plate is filled with a light absorbing material.

According to a fourth aspect of the present invention, there is provided an optical modulator including: a thin plate made of a material having an electrooptic effect and having a thickness of 20 μm or less; an optical waveguide formed in a top surface or a bottom surface of the thin plate; and a modulation electrode which is formed in the top surface of the thin plate to modulate light which propagates in the optical waveguide, wherein a light absorbing material is coated on a portion except the vicinity of an output waveguide in the end surface of the output waveguide.

According to a fifth aspect of the present invention, there is provided an optical modulator including: a thin plate made of a material having an electrooptic effect and having a thickness of 20 μm or less; an optical waveguide formed in a top surface or a bottom surface of the thin plate; and a modulation electrode which is formed in the top surface of the thin plate to modulate light which propagates in the optical waveguide, wherein the optical waveguide has an optical junction portion in which a plurality of optical waveguide portions are joined together, and a high refractive index region is disposed in at least one side of an output waveguide from the optical junction portion to the end portion of the optical waveguide.

According to a sixth aspect of the present invention, in the optical modulator according to the fifth aspect, the high refractive index region is formed by doping a high refractive index material such as impurities of Ti, Zn or Mg.

According to a seventh aspect of the present invention, in the optical modulator according to the fifth aspect, a distance from the high refractive index region to the central portion of the output waveguide is 0.5 to 3 times the mode diameter of propagation light of the output waveguide.

According to an eighth aspect of the present invention, there is provided an optical modulator including: a thin plate made of a material having an electrooptic effect and having a thickness of 20 μm or less; an optical waveguide formed in a top surface or a bottom surface of the thin plate; and a modulation electrode which is formed in the top surface of the thin plate to modulate light which propagates in the optical waveguide, wherein the optical waveguide has an optical junction portion in which a plurality of optical waveguide portions are joined together, and a light absorbing region is disposed in at least one of the top and bottom surfaces of the thin plate of an output waveguide from the optical junction portion to the end portion of the optical waveguide.

According to a ninth aspect of the present invention, there is provided an optical modulator including: a thin plate made of a material having an electrooptic effect and having a thickness of 20 μm or less; an optical waveguide formed in a top surface or a bottom surface of the thin plate; and a modulation electrode which is formed in the top surface of the thin plate to modulate light which propagates in the optical waveguide, wherein the optical waveguide has an optical junction portion in which a plurality of optical waveguide portions are joined together, and the optical junction portion has a directional coupler or an X cross waveguide.

According to a tenth aspect of the present invention, there is provided an optical modulator including: a thin plate made of a material having an electrooptic effect and having a thickness of 20 μm or less; an optical waveguide formed in a top surface or a bottom surface of the thin plate; and a modulation electrode which is formed in the top surface of the thin plate to modulate light which propagates in the optical waveguide, wherein the optical waveguide is a Mach-Zehnder type optical waveguide, and the optical waveguide in an output side of an optical junction portion of the Mach-Zehnder type optical waveguide is configured by two waveguides for radiation light with an output waveguide interposed therebetween.

According to an eleventh aspect of the present invention, in the optical modulator according to the tenth aspect, in the optical junction portion, two branch waveguides and the two waveguides for radiation light for configuring the Mach-Zehnder type optical waveguide are configured to be line symmetrical with respect to a light propagation direction of the output waveguide.

According to a twelfth aspect of the present invention, in the optical modulator according to the tenth or eleventh aspect, in the optical junction portion, the width of each of the waveguides for radiation light is narrower than that of the output waveguide.

According to a thirteenth aspect of the present invention, in the optical modulator according to any one of the tenth to twelfth aspects, in the optical junction portion, an angle between each of the waveguides for radiation light and the output waveguide is 1° or less.

According to a fourteenth aspect of the present invention, in the optical modulator according to any one of the first to thirteenth aspects, the optical modulator is a pigtail type optical modulator.

According to the first aspect of the present invention, since the shielding means for shielding the portion of the radiation light is provided, it is possible to suppress the portion of the radiation light from reaching the end portion of the thin plate and to reduce the region of a radiation light spot formed in the end portion of the thin plate. Therefore, it is possible to easily separate a propagation light spot and a radiation light spot from each other.

According to the second aspect of the present invention, since the shielding means is the concave portion or the through-hole formed in the thin plate, it is possible to efficiently shield the radiation light. The concave portion or the thorough-hole was conventionally hard to form because the radiation light is radiated in the substrate in a case of using a thick plate and thus the concave portion or the through-hole must have a depth of at least several tens μm for the purpose of shielding. However, in a case of the thin plate, since the thin plate has a thickness of 20 μm or less, the concave portion or the through-hole can be easily formed by dry etching or a laser cutter used for manufacturing a conventional optical modulator having a ridge portion.

In addition, since the shielding means is the concave portion or the thorough-hole formed in the thin plate, the shortest distance from the waveguide to the shielding means is 5 to 10 μm, and the length of the shielding means in the direction perpendicular to the waveguide is at least 0.5 times the diameter of a fiber, it is possible to efficiently shield the radiation light which is inputted into an optical fiber without attenuating the light wave which propagates in the optical waveguide.

According to the third aspect of the present invention, since the concave portion or the through-hole formed in the thin plate is filled with the light absorbing material, it is possible to more efficiently shield stray light such as the radiation light.

According to the fourth aspect of the present invention, since the light absorbing material is coated on the portion except the vicinity of the output waveguide in the end surface of the output waveguide, the light absorbing material functions as an iris and thus only the guided light is inputted into the fiber.

According to the fifth aspect of the present invention, the optical waveguide has the high refractive index region which is disposed in the side of the output waveguide from the optical junction portion in which a plurality of optical waveguide portions are joined together to the end portion of the optical waveguide, and a structure for rapidly separating the radiation light which is radiated from the optical junction portion to the outside of the optical waveguide from the propagation light. In the conventional optical modulator having the thick plate, since the radiation light is radiated in the substrate, the effect of processing the surface of the substrate is obtained only in the vicinity of the optical junction portion. Thus; the adjustment effect of the radiation light is insignificant. Meanwhile, in the thin plate, as shown in FIG. 4, the radiation light in the vicinity of the waveguide is gradually radiated at a large angle, together with propagation. By this configuration, it is possible to spatially separate the radiation light and the propagation light from each other in the end surface of the thin plate to avoid a problem that the radiation light is inputted into the optical fiber into which the propagation light is introduced and to suppress deterioration of an extinction ratio of the optical modulator and misalignment at the time of connecting the fiber.

According to the sixth aspect of the present invention, since the high refractive index region is formed by doping impurities such as Ti or Zn, the optical waveguide and the high refractive index region can be simultaneously formed using a thermal diffusion method or a proton-exchange method. Therefore, since the waveguide and the high refractive index region need not be separately formed, the manufacturing process is not complicated and thus productivity does not deteriorate.

According to the seventh aspect of the present invention, since the distance from the high refractive index region to the central portion of the optical waveguide is 0.5 to 3 times the mode diameter of propagation light of the output waveguide, it is possible to separate the propagation light and the radiation light from each other in a minute region without leaking the propagation light to the high refractive index region. Accordingly, it is possible to realize downsizing of an optical modulator module.

According to the eighth aspect of the present invention, as shown in FIG. 5, since the light absorbing material is formed on the surface of the thin plate from the vicinity of the optical junction portion of the optical waveguide in the output side to the output end, and thus the radiation light is always in contact with the surface of the thin plate, the intensity of the radiation light is exponentially attenuated. Accordingly, the radiation light is not observed in the output end (position separated from the optical junction portion by a distance of 3500 μm).

According to the ninth aspect of the present invention, since the optical junction portion of the optical waveguide has the directional coupler or the X cross waveguide, the radiation light which was generated in a Y-shaped branching structure is not generated. Accordingly, the extinction ratio of the optical modulator does not deteriorate. In this configuration, two waveguides exist in the output end and one of the waveguides may be used for a PD monitor.

According to the tenth aspect of the present invention, since the optical waveguide is the Mach-Zehnder type optical waveguide and the optical waveguide in the output side of the optical junction portion of the Mach-Zehnder type optical waveguide is configured by the two waveguides for radiation light with the output waveguide interposed therebetween, the radiation light generated at the optical junction portion is guided to the waveguide for radiation light and thus the propagation light which propagates in the output waveguide and the radiation light are efficiently separated from each other spatially.

According to the eleventh aspect of the present invention, since, in the optical junction portion, the two branch waveguides and the two waveguides for radiation light for configuring the Mach-Zehnder type optical waveguide are configured to be line symmetrical with respect to the light propagation direction of the output waveguide, the propagation light can be introduced into the output waveguide, and the radiation light can be introduced into the waveguide for radiation light. Furthermore, the propagation light can be suppressed from being introduced into the waveguide for radiation light, and the radiation light can be suppressed from being introduced into the output waveguide. Accordingly, it is possible to efficiently separate the propagation light and the radiation light from each other spatially.

According to the twelfth aspect of the present invention, since, in the optical junction portion, the width of each of the waveguides for radiation light is narrower than that of the output waveguide, the propagation light can be introduced into the output waveguide, and the radiation light can be introduced into the waveguide for radiation light. Furthermore, the propagation light can be suppressed from being introduced into the waveguide for radiation light, and the radiation light can be suppressed from being introduced into the output waveguide. Accordingly, it is possible to efficiently separate the propagation light and the radiation light from each other spatially.

According to the thirteenth aspect of the present invention, since, in the optical junction portion, the angle between each of the waveguides for radiation light and the output waveguide is 1° or less, the propagation light can be introduced into the output waveguide, and the radiation light can be introduced into the waveguide for radiation light. Furthermore, the propagation light can be suppressed from being introduced into the waveguide for radiation light, and the radiation light can be suppressed from being introduced into the output waveguide. Accordingly, it is possible to efficiently separate the propagation light and the radiation light from each other spatially.

According to the fourteenth aspect of the present invention, since the optical modulator is the pigtail type optical modulator, it is possible to separate the radiation light and the propagation light from each other or to remove the radiation light efficiently even in the pigtail type optical modulator. Accordingly, it is possible to provide a pigtail type optical modulator capable of suppressing loss of the optical modulator or deterioration of the extinction ratio.

REFERENCE NUMERALS

Figure 1:
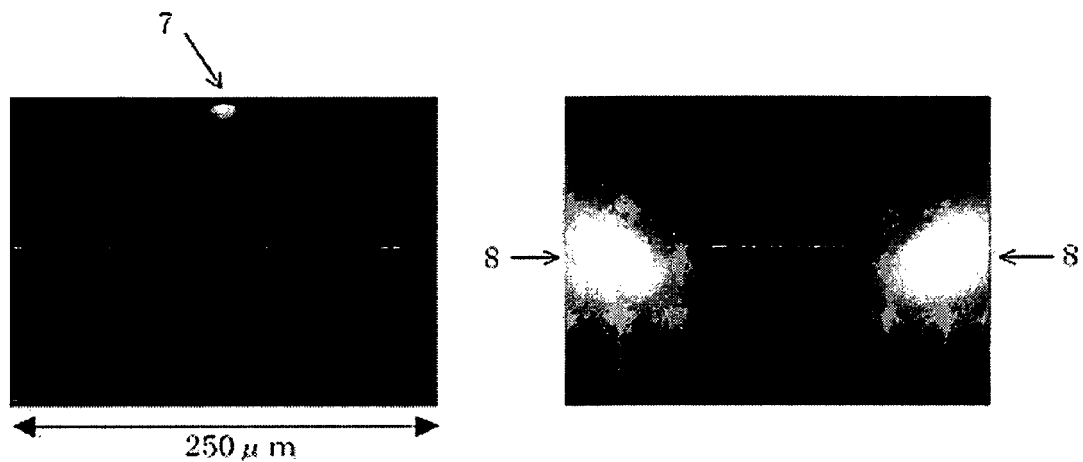
FIG. 1 is a view showing the aspect of radiation light and propagation light of a conventional optical modulator.

1: thin plate
2: adhesive layer
3: reinforcement plate
4: Mach-Zehnder type waveguide
5: output optical waveguide
6: input light
7: propagation light
8: radiation light
9: shielding means
10: high refractive index region
11: absorbing film for removing radiation light
20: optical junction portion
21, 22: waveguide for radiation light
23, 24: branch waveguide
30, 31: optical fiber
32, 33: photodetector (PD)

DESCRIPTION OF THE EMBODIMENTS

Hereinafter, preferred embodiments of the present invention will be described in detail.

Figure 2:
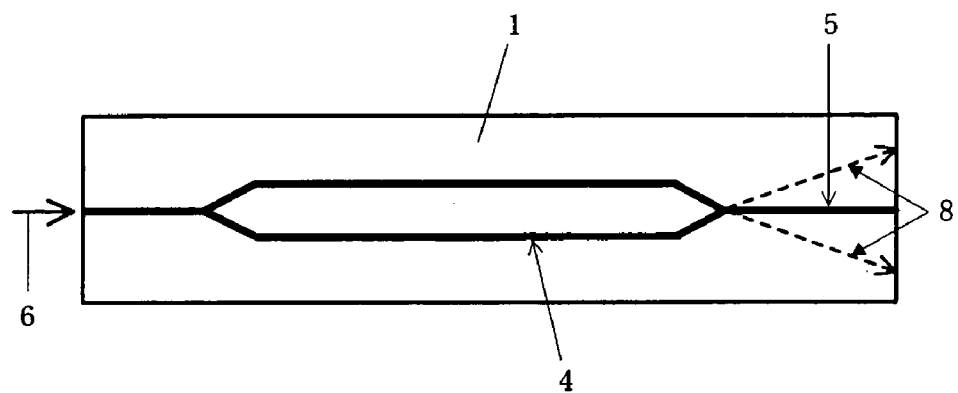
FIG. 2A is a schematic view of an optical modulator using a thin plate and FIG. 2B is a view schematically showing the aspect of radiation light and propagation light in an end portion of the optical modulator.
Figure 2:
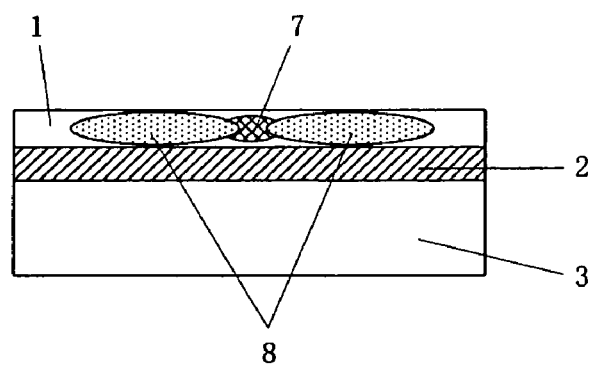
Figure 4:
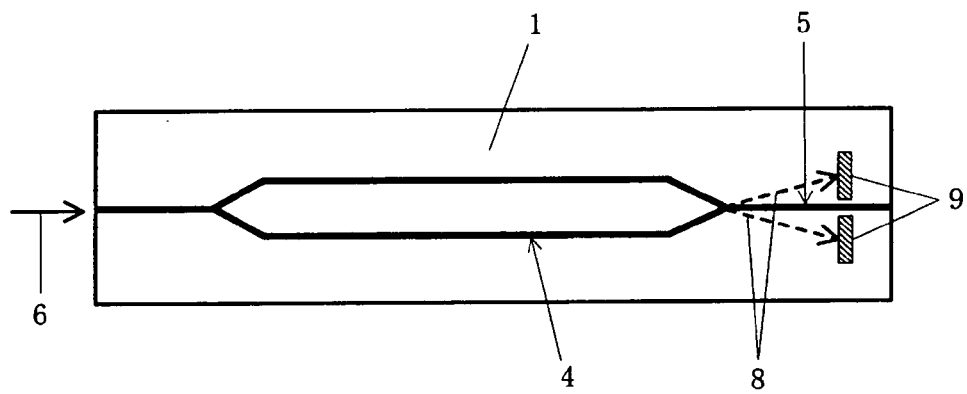
FIG. 4 is a schematic view showing an optical modulator according to a first embodiment of the present invention.

FIG. 4 shows an example of an optical modulator according to an embodiment of the present invention. In a thin plate 1 made of a material having an electrooptic effect, an optical waveguide 4 is formed in a top surface of the thin plate as shown in FIG. 2 and an unshown modulation electrode (signal electrode, ground electrode or the like) for modulating a light wave which propagates in the optical waveguide 4 is formed in the top surface of the thin plate. Alternatively, the optical waveguide may be formed in a bottom surface of the thin plate.

The optical waveguide may be formed by diffusing Ti or the like on the front surface of the substrate using a thermal diffusion method or a proton-exchange method.

The modulation electrode such as the signal electrode or the ground electrode may be formed using a method of forming an electrode pattern of Ti or Au and a gold plating method. After forming the optical waveguide, a buffer layer (not shown) such as a dielectric layer of $SiO_2$ may be formed on the surface of the substrate and the modulation electrode may be formed on the buffer layer, if desired.

The material having an electrooptic effect may be, for example, lithium niobate, lithium tantalite, PLZT (lead lanthanum zirconate titanate), silica-based material, or combination thereof. More particularly, lithium niobate (LN) crystal having a high electrooptic effect is very suitably used.

In a method of manufacturing the thin plate including an optical modulation element, the above-described optical waveguide or the modulation electrode is formed in the substrate having a thickness of several hundreds μm and the bottom surface of the substrate is polished to have a thickness of, for example, 20 μm or less. Although the optical waveguide or the modulation electrode may be formed after manufacturing the thin plate, the thin plate may be damaged by thermal impact at the time of forming the optical waveguide or mechanical impact due to treatment of the thin film at the time of a variety of processes. Accordingly, it is preferable that the optical waveguide or the modulation electrode is formed and the bottom surface of the substrate is then polished.

As a material used for a reinforcement plate, various materials may be used and, for example, in addition to the same material as the thin plate, a material having dielectric constant lower than that of the thin plate, such as quartz, glass or alumina, or a material having crystal orientation different from that of the thin plate may be used. A material having the same linear coefficient of expansion as the thin plate is preferably used for the purpose of stabilizing modulation characteristics of the optical modulator with respect to a change in temperature. When the material having the same linear coefficient of expansion as the thin plate is hard to select, a material having the same linear coefficient of expansion as the thin plate is used in an adhesive for bonding the thin plate and the reinforcement plate, like Patent Document 2.

As an adhesive layer 2 for bonding the thin plate 1 and the reinforcement plate 3, various adhesive materials such as an epoxy-based adhesive, a thermosetting adhesive, an UV-curing adhesive, a solder glass, a thermosetting, photocuring or phototackifier resin adhesive sheet may be used. Alternatively, by a direct bonding method, the thin plate and the reinforcement plate may be directly bonded without using the adhesive.

Figure 5:
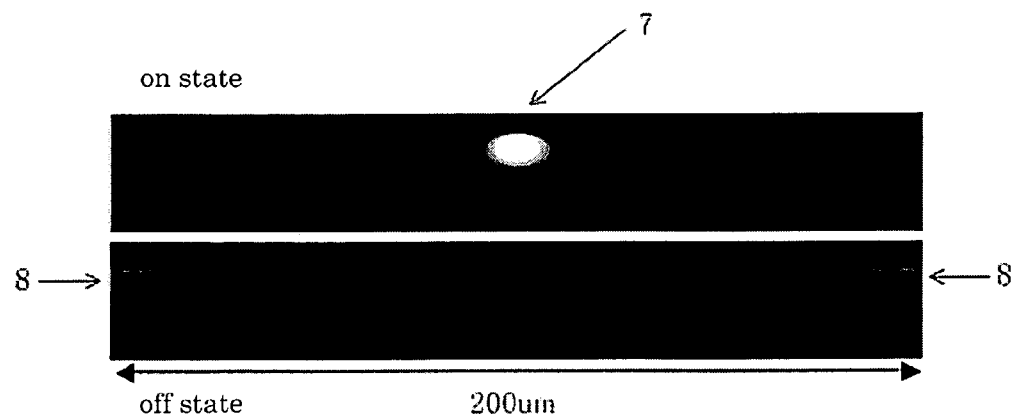
FIG. 5 is a view showing the aspect of radiation light and propagation light in the optical modulator according to the first embodiment shown in FIG. 4.

In the optical modulator of FIG. 4, through-holes 9 or concave portions are formed in the side surface of the output waveguide 5 and the through-holes are filled with a light absorbing material. By this configuration, as shown in FIG. 5, since the radiation light 8 is shielded, the radiation light 8 and the guided light 7 can be separated from each other. Therefore, when an optical fiber is connected to the end surface of an output portion of the optical modulator, it is possible to avoid a problem that the radiation light 8 is inputted into the optical fiber into which only the guided light (propagation light) must be introduced, and to suppress deterioration of an extinction ratio of the optical modulator. FIG. 5 shows a light intensity distribution in the end portion of the output side of the optical modulator shown in FIG. 4.

As the light absorbing material, a metal film such as Al, Au, Ti or amorphous Si may be coated using a deposition or sputtering method. A light absorbing region may be formed to cover the top surface, the bottom surface and the side surface of the thin plate 1, as shown in FIG. 8B which is a cross-sectional view taken along a dashed line B-B' in FIG. 8A or to cover a portion of the top surface or the bottom surface. The light absorbing region may be formed on a portion except the vicinity of the output waveguide in the end surface of the output waveguide.

Figure 6:
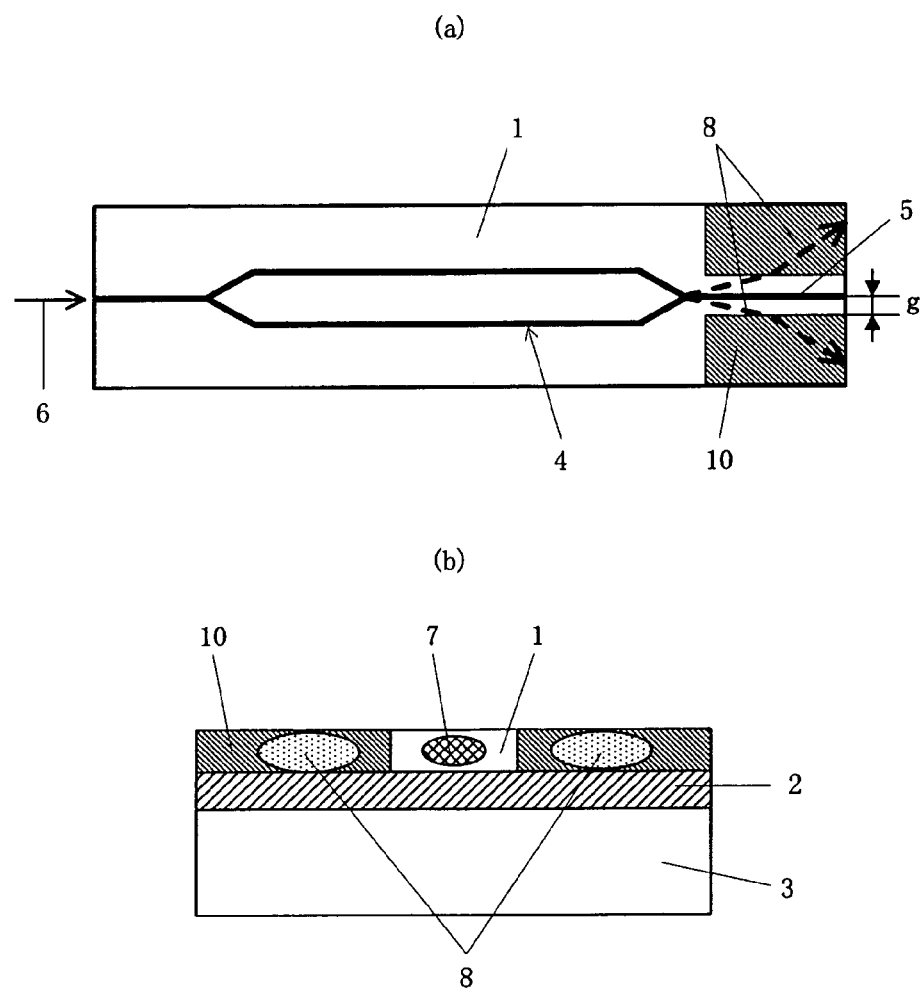
FIG. 6A is a schematic view showing an optical modulator according to a second embodiment of the present invention and FIG. 6B is a view schematically showing the aspect of radiation light and propagation light in an end portion of the optical modulator.

FIG. 6 shows an optical modulator according to another embodiment of the present invention. In the optical modulator shown in FIG. 6A, a high refractive index region 10 for separating the radiation light and the propagation light from each other is provided. By this configuration, since the radiation light 8 is refracted, it is possible to clearly separate the propagation light and the radiation light from each other. Therefore, it is possible to separate the propagation light and the radiation light from each other similar to an element having a substrate thickness of about 500 μm and to facilitate the treatment thereof.

The high refractive index region can be formed by doping impurities such as Ti or Zn into the substrate by a thermal diffusion method or a proton-exchange method. Since this method can be performed by the same process as the method of forming the optical waveguide, this method may be simultaneously formed with the method of forming the optical waveguide.

However, when a gap between the high refractive index region and the output waveguide is reduced for the purpose of reducing a separating region for separating the propagation light and the radiation light, the propagation light leaks. In contrast, when the separating region increases for the purpose of suppressing the leakage of the propagation light, the output waveguide must lengthen. Thus, it is necessary to determine a shortest distance g from the central portion of the output waveguide to the high refractive index region. When the length of the output waveguide (length of the output waveguide from the optical junction portion to the end portion of the substrate) is 2000 to 7000 μm, the shortest distance g is set to 0.5 to 3 times the mode diameter of the output waveguide such that the distance between the radiation light and the propagation light can be at least the diameter of the fiber. When the length of the output waveguide is 3000 to 4000 μm, the shortest distance g is set to 1 to 2 times the mode diameter of the output waveguide such that the distance between the radiation light and the propagation light can be at least the diameter of the fiber.

Figure 7:
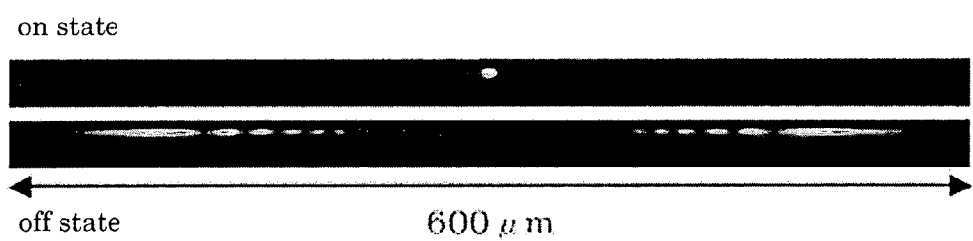
FIG. 7 is a view showing the aspect of the radiation light and the propagation light in the optical modulator according to the second embodiment shown in FIG. 6.

FIG. 6B is a view schematically showing the propagation light spot 7 or the radiation light spot 8 in the end portion of the output side of the optical modulator of FIG. 6A. Reference numeral 2 denotes an adhesive layer and 3 denotes a reinforcement plate. FIG. 7 shows a light intensity distribution in the end portion of the output side of the optical modulator shown in FIG. 6A.

Figure 8:
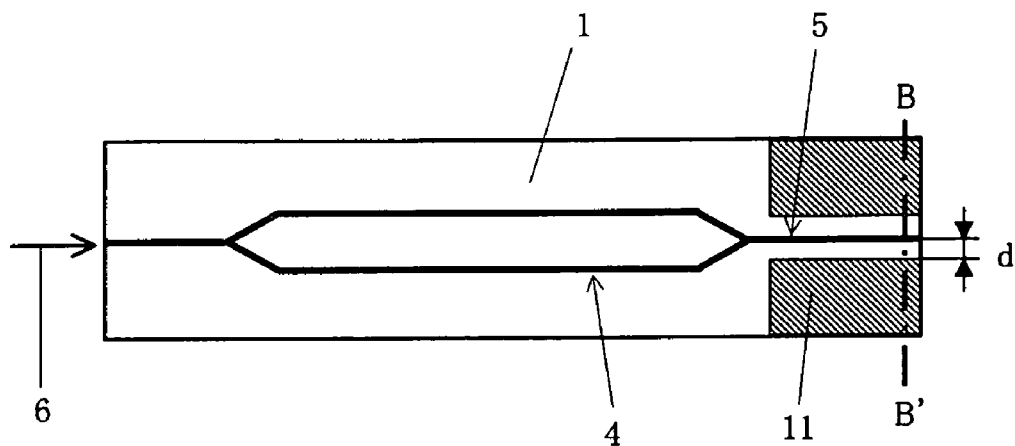
FIG. 8A is a schematic view showing an optical modulator according to a third embodiment of the present invention and FIG. 8B is a cross-sectional view thereof.
Figure 8:
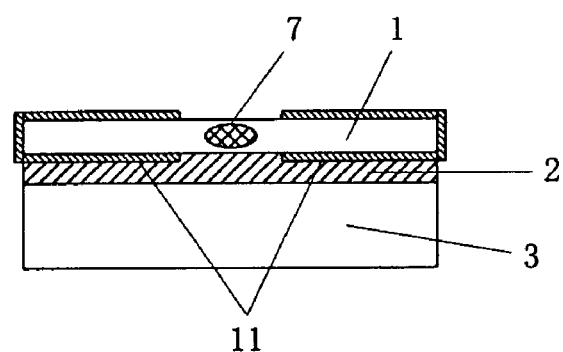

FIG. 8 shows an optical modulator according to another embodiment of the present invention.

In the optical modulator shown in FIG. 8, an absorbing region 11 for absorbing the radiation light is provided. By this configuration, since the radiation light (not shown) is absorbed, deterioration of the extinction ratio due to the radiation light is not caused.

Even in this case, when a gap between the absorbing region and the output waveguide is reduced for the purpose of reducing the absorbing region of the radiation light, the propagation light is absorbed. In contrast, when the absorbing region increases for the purpose of suppressing the absorption of the propagation light, the output waveguide must lengthen. Thus, it is necessary to determine a shortest distance d from the central portion of the output waveguide to the absorbing region. Even in the case, when the length of the output waveguide is 3500 μm, the shortest distance d is set to 0.5 to 3 times the mode diameter of the output waveguide such that the radiation light is absorbed and the propagation light is not absorbed. By adjusting an interval between the waveguide and the metal for configuring the absorbing region, it is possible to increase the extinction ratio of a polarized wave.

When the radiation light is monitored by a photodetector (PD), by refracting or reflecting the radiation light 8 by the through-hole 9 or the concave portion of FIG. 4 to be outputted from the substrate, it is possible to detect the radiation light by the PD. As shown in FIG. 6, the radiation light 8 distant from the propagation light can be similarly detected.

By changing the optical waveguide of the optical junction portion from a Y-shaped waveguide to a directional coupler or an X cross waveguide to form two waveguides at the output end, it is possible to monitor the output light at one side.

Figure 9:
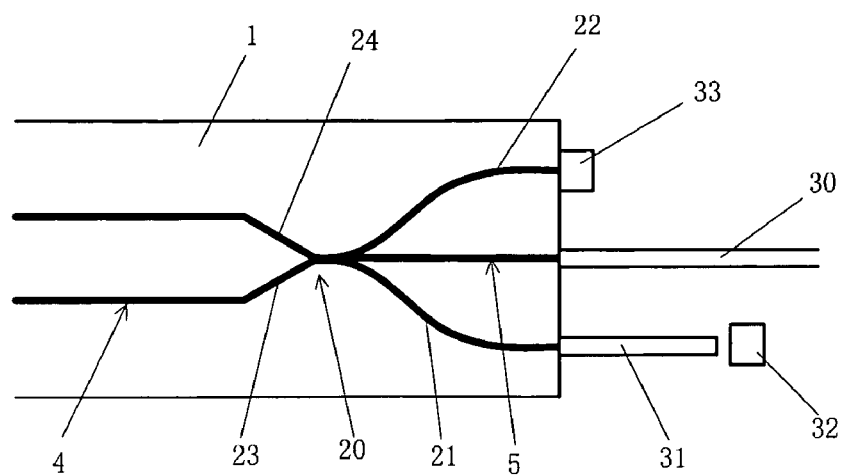
FIG. 9 is a view showing the optical modulator according to an embodiment when a 2×3 branch waveguide is used in an optical junction portion.

FIG. 9 shows an optical modulator according to another embodiment of the present invention.

The optical modulator of FIG. 9 is characterized in that an optical junction portion 20 has a 2×3 branch waveguide having two optical waveguides 23 and 24 provided at the input side and three optical waveguides 5, 21 and 22 provided at the output side.

Particularly, the optical waveguides 23 and 24 are two branch waveguides of the Mach-Zehnder type optical waveguide, and the optical waveguide 5 configures an output waveguide of the Mach-Zehnder type optical waveguide. The optical waveguides 21 and 22 are two waveguides for radiation light with the output waveguide 5 interposed therebetween.

In the optical junction portion 20 of FIG. 9, the propagation light, which is the output light modulated in the Mach-Zehnder type optical waveguide, is outputted from the output waveguide 5 and the radiation light radiated from the optical junction portion is introduced into the waveguides for radiation light 21 and 22, propagates in the waveguides for radiation light, and is outputted from the thin plate. Therefore, the optical junction portion is characterized in that the propagation light can be introduced into the output waveguide, the radiation light can be introduced into the waveguide for radiation light, the propagation light can be suppressed from being introduced into the waveguide for radiation light, and the radiation light can be suppressed from being introduced into the output waveguide.

Figure 10:
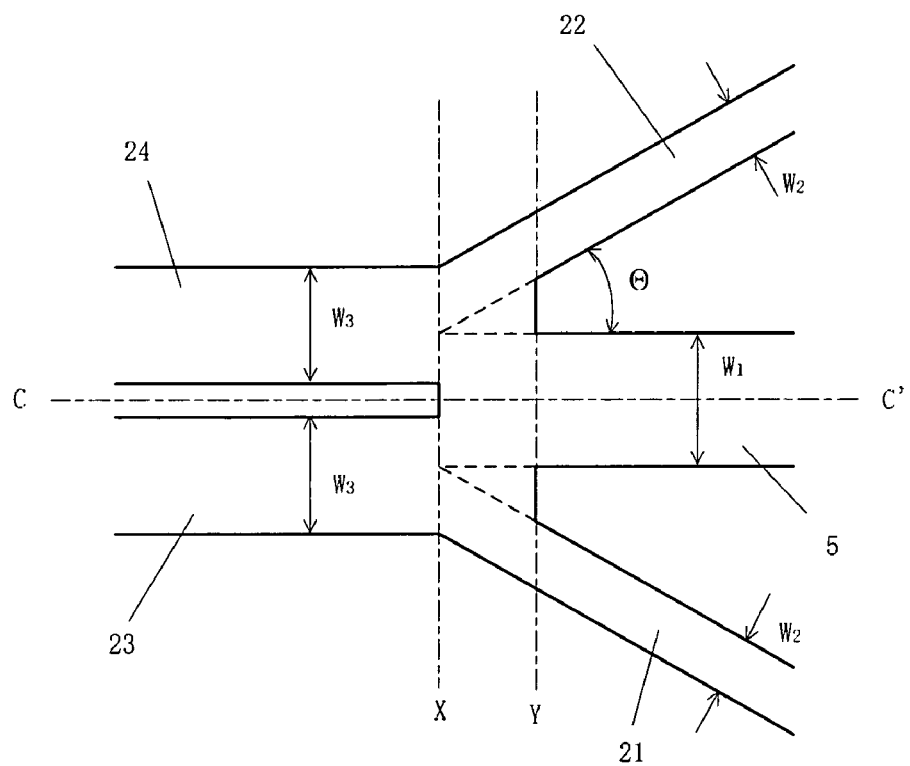
FIG. 10 is an enlarged view of the optical junction portion of FIG. 9.

The optical junction portion having the characteristics as described above must satisfy the following conditions. FIG. 10 is an enlarged view of a portion of the optical junction portion 20 of FIG. 9. The branch waveguides 23 and 24 are adjusted to be parallel to each other just before the junction point.

(1) The two branch waveguides 23 and 24 and the two waveguides for radiation light 21 and 22 for configuring the Mach-Zehnder type optical waveguide are configured to be line symmetrical with respect to a light propagation direction (dashed line C-C') of the output waveguide 5.

(2) The width w2 of each of the waveguides for radiation light 21 and 23 is narrower than the width w1 of the output waveguide 5.

(3) An angle θ between the waveguide for radiation light 21 or 22 and the output waveguide 5 is 1° or less.

The dotted line between the dashed line X and the dashed line Y denotes a virtual extension line of the output waveguide 5 between the waveguides for radiation light 21 and 22. In FIG. 10, the waveguide for radiation light starts to be branched at the position of the dashed line X in which the branch waveguides 23 and 24 are coupled. If required, the coupled state of the branch waveguides may be maintained for a while and then the waveguide for radiation light may start to be branched. For example, when the width w3 of the branch waveguide is 3.5 μm, the width w1 of the output waveguide 5 is 4 μm, the width w2 of the waveguide for radiation light is about 2 μm, the angle θ is 0.5°, and the interval between the dashed lines X and Y is about 115 μm, it is possible to efficiently separate the propagation light and the radiation light from each other.

In the embodiment of FIG. 9, a method of monitoring the radiation light by the PD will be described.

As shown in FIG. 9, an optical fiber 31 is connected to the termination of the waveguide for radiation light 21 and a PD 32 is disposed at the other end of the optical fiber such that a portion of the radiation light can be monitored by the PD. When the convergence property of the light wave outputted from the waveguide for radiation light is high or the PD can approach the end portion of the waveguide for radiation light, the optical fiber 31 may be omitted. Of course, a PD 33 may be directly disposed at the termination of the waveguide for radiation light 22. Reference numeral 30 is an optical fiber for introducing the propagation light from the output waveguide 5.

EXAMPLE

Next, examples related to the optical modulator of the present invention and the test thereof will be described.

Example 1

In an optical modulation element of a thin plate, an X-cut type LN substrate having a thickness of 500 μm was used as a substrate and an optical waveguide was formed in the top surface of the substrate by a Ti diffusing process. The optical waveguide is a Mach-Zehnder type optical waveguide as shown in FIG. 4 and the distance from an optical junction portion to the end portion of the substrate is 3500 μm. The bottom surface of the substrate was polished by a polishing machine until the thickness of the substrate becomes 10 μm, and was then attached to a reinforcement plate using an UV-curing adhesive as an adhesive layer. Next, a modulation electrode was formed by a plating process, a through-hole having a depth of 10 μm was formed in the way from the optical junction portion to the output end portion by a laser cutter as a shielding means and Al was attached to the concave portion. Thereafter, the substrate was cut to have a predetermined size, thereby manufacturing the thin plate having the optical modulation element.

Example 2

In an optical modulation element of a thin plate, an X-cut type LN substrate having a thickness of 500 μm was used as a substrate, an optical waveguide was formed in the top surface of the substrate by a Ti diffusing process, and high refractive index regions (Ti diffusion, a shortest distance from the central portion of the output waveguide to the high refractive index region: 15 μm) were formed in the both sides of the output waveguide. The optical waveguide is a Mach-Zehnder type optical waveguide as shown in FIG. 6 and the distance from an optical junction portion to the end portion of the substrate is 3500 μm. The bottom surface of the substrate was polished by a polishing machine until the thickness of the substrate becomes 10 μm, and was then attached to a reinforcement plate using an UV-curing adhesive as an adhesive layer. Next, a modulation electrode was formed by a plating process and the substrate was cut to have a predetermined size, thereby manufacturing the thin plate having the optical modulation element.

Example 3

In an optical modulation element of a thin plate, an X-cut type LN substrate having a thickness of 500 μm was used as a substrate and an optical waveguide was formed in the top surface of the substrate by a Ti diffusing process. The optical waveguide is a Mach-Zehnder type optical waveguide as shown in FIG. 8 and the distance from an optical junction portion to the end portion of the substrate is 3500 μm. The bottom surface of the substrate was polished by a polishing machine until the thickness of the substrate becomes 10 μm, and was then attached to a reinforcement plate using an UV-curing adhesive as an adhesive layer. Light absorbing regions (material: Al, a shortest distance from the central portion of the output waveguide to the light absorbing region: 15 μm) were formed in the both sides of the output waveguide. Next, a modulation electrode was formed by a plating process and the substrate was cut to have a predetermined size, thereby manufacturing the thin plate having the optical modulation element.

Comparative Example

In an optical modulation element of a thin plate, an X-cut type LN substrate having a thickness of 500 μm was used as a substrate and an optical waveguide was formed in the top surface of the substrate by a Ti diffusing process. The optical waveguide is a Mach-Zehnder type optical waveguide as shown in FIG. 8 and the distance from an optical junction portion to the end portion of the substrate is 3500 μm. The bottom surface of the substrate was polished by a polishing machine until the thickness of the substrate becomes 10 μm, and was then attached to a reinforcement plate using an UV-curing adhesive as an adhesive layer. Next, a modulation electrode was formed by a plating process and the substrate was cut to have a predetermined size, thereby manufacturing the thin plate having the optical modulation element.

Test Method

The optical modulators of examples 1, 2 and 3 and the comparative example were connected to optical fibers, respectively. Next, the extinction ratios of the optical modulators were measured by an optical power meter. The measured results are shown in Table 1.

TABLE 1

|  | Loss [dB] | σ (n = 5) | Extinction ratio [dB] | σ (n = 5) |
|---|---|---|---|---|
| Example 1 | 3.2 | 0.3 | 23.5 | 6.5 |
| Example 2 | 2.7 | 0.1 | 28.1 | 5.2 |
| Example 3 | 3.0 | 0.1 | 28.8 | 4.2 |
| Comparative example | 3.0 | 0.3 | 20.3 | 8.7 |

Figure 3:
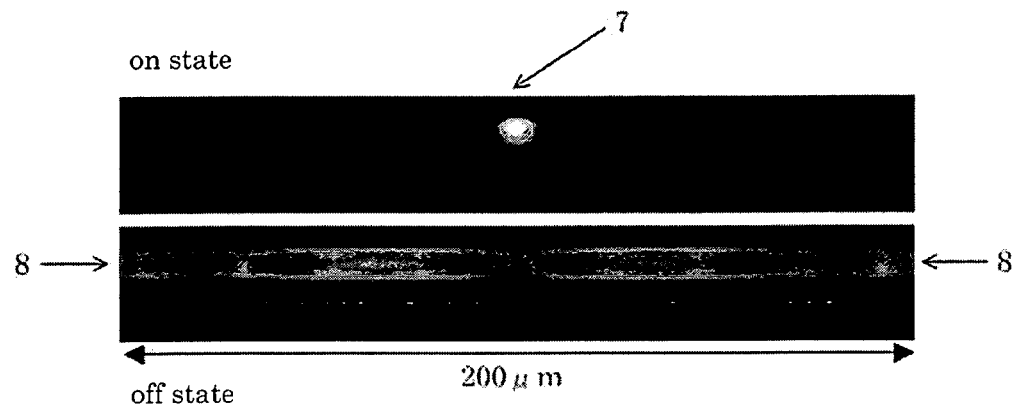
FIG. 3 is a view showing the aspect of the radiation light and the propagation light in the optical modulator shown in FIG. 2.

From the result of Table 1, it can be seen that the extinction ratios of the optical modulators of the examples 1, 2 and 3 are improved compared with the comparative example. FIGS. 5 and 7 are near-field images in the output end surface of Examples 1 and 2. It can be seen that propagation light and radiation light are clearly separated from each other, compared with the comparative example shown in FIG. 3. Examples 1, 2 and 3 are improved in view of loss and a standard deviation σ of the extinction ratio and thus misalignment due to the radiation light at the time of connecting the fiber is reduced.

As described above, according to the present invention, it is possible to provide an optical modulator capable of efficiently separating radiation light and propagation light from each other to suppress deterioration of an extinction ratio of the optical modulator.

In addition, since misalignment at the time of connecting a fiber is reduced, it is possible to improve manufacturing yield.

What is claimed is:

1. An optical modulator comprising:
a thin plate made of a material having an electrooptic effect and having a thickness of 20μm or less;
an optical waveguide formed in a top surface or a bottom surface of the thin plate; and
a modulation electrode which is formed in the top surface of the thin plate to modulate light which propagates in the optical waveguide,
wherein the optical waveguide has an optical junction portion in which a plurality of optical waveguide portions are joined together, a shielding means for shielding a portion of radiation light radiated from the optical junction portion, and the shielding means is a concave portion or a through-hole formed in the thin plate, a shortest distance from the waveguide to the shielding means is 5 to 10 µm, and a length of the shielding means in a direction perpendicular to the waveguide is at least 0.5 times a diameter of a fiber coupled to the optical waveguide.

2. The optical modulator according to claim 1, wherein the concave portion or the through-hole formed in the thin plate is filled with a light absorbing material.

3. An optical modulator comprising:
a thin plate made of a material having an electrooptic effect and having a thickness of 20 µm or less;
an optical waveguide formed in a top surface or a bottom surface of the thin plate; and
a modulation electrode which is formed in the top surface of the thin plate to modulate light which propagates in the optical waveguide,
wherein the optical waveguide has an optical junction portion in which a plurality of optical waveguide portions are joined together, a high refractive index region is disposed in at least one side of an output waveguide from the optical junction portion to an end portion of the optical waveguide, and a distance from the high refractive index region to a central portion of the output waveguide is 0.5 to 3 times a mode diameter of propagation light of the output waveguide.

4. The optical modulator according to claim 3, wherein the high refractive index region is formed by doping a high refractive index material.

5. An optical modulator comprising:
a thin plate made of a material having an electrooptic effect and having a thickness of 20 µm or less;
an optical waveguide formed in a top surface or a bottom surface of the thin plate; and
a modulation electrode which is formed in the top surface of the thin plate to modulate light which propagates in the optical waveguide,
wherein the optical waveguide has an optical junction portion in which a plurality of optical waveguide portions are joined together, and the optical junction portion has a directional coupler or an X cross waveguide.

6. An optical modulator comprising:
a thin plate made of a material having an electrooptic effect and having a thickness of 20 µm or less;
an optical waveguide formed in a top surface or a bottom surface of the thin plate; and
a modulation electrode which is formed in the top surface of the thin plate to modulate light which propagates in the optical waveguide,
wherein the optical waveguide is a Mach-Zehnder type optical waveguide, and the optical waveguide in an output side of an optical junction portion of the Mach-Zehnder type optical waveguide is configured by two waveguides for radiation light with an output waveguide interposed therebetween.

7. The optical modulator according to claim 6, wherein, in the optical junction portion, two branch waveguides and the two waveguides for radiation light for configuring the Mach-Zehnder type optical waveguide are configured to be line symmetrical with respect to a light propagation direction of the output waveguide.

8. The optical modulator according to claim 6, wherein, in the optical junction portion, the width of each of the waveguides for radiation light is narrower than the width of the output waveguide.

9. The optical modulator according to claim 6, wherein, in the optical junction portion, an angle between each of the waveguides for radiation light and the output waveguide is 1° or less.

10. The optical modulator according to claim 1, wherein the optical modulator is a pigtail type optical modulator.

11. The optical modulator according to claim 4, wherein the high refractive index region is formed by doping one or more selected from the group consisting of impurities of Ti, impurities of Zn.and impurities of Mg.

12. The optical modulator according to claim 7, wherein, in the optical junction portion, the width of each of the waveguides for radiation light is narrower than the width of the output waveguide;

13. The optical modulator according to claim 7, wherein, in the optical junction portion, an angle between each of the waveguides for radiation light and the output waveguide is 1° or less.

14. The optical modulator according to claim 8, wherein, in the optical junction portion, an angle between each of the waveguides for radiation light and the output waveguide is 1° or less.

15. The optical modulator according to claim 3, wherein the optical modulator is a pigtail type optical modulator.

* * * * *